US008522244B2

(12) United States Patent
Chung et al.

(10) Patent No.: US 8,522,244 B2
(45) Date of Patent: Aug. 27, 2013

(54) METHOD AND APPARATUS FOR SCHEDULING FOR MULTIPLE MEMORY CONTROLLERS

(75) Inventors: Jaewoong Chung, Bellevue, WA (US); Debarshi Chatterjee, Mountain View, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 438 days.

(21) Appl. No.: 12/775,645

(22) Filed: May 7, 2010

(65) Prior Publication Data

US 2011/0276973 A1 Nov. 10, 2011

(51) Int. Cl.
*G06F 9/50* (2006.01)
*G06F 13/00* (2006.01)

(52) U.S. Cl.
USPC ........... 718/103; 718/102; 718/104; 711/100; 711/147; 711/148; 711/149; 711/150; 711/151

(58) Field of Classification Search
None
See application file for complete search history.

(56) References Cited

U.S. PATENT DOCUMENTS

| | | | |
|---|---|---|---|
| 6,378,051 | B1 | 4/2002 | Henson et al. |
| 6,909,691 | B1 | 6/2005 | Goyal et al. |
| 6,928,646 | B1 | 8/2005 | James et al. |
| 2001/0056456 | A1 | 12/2001 | Cota-Robles |
| 2002/0181440 | A1 | 12/2002 | Norman et al. |
| 2003/0221071 | A1 | 11/2003 | McKenney et al. |
| 2004/0226015 | A1 | 11/2004 | Leonard et al. |
| 2007/0124793 | A1 | 5/2007 | Wang et al. |
| 2008/0222640 | A1 | 9/2008 | Daly et al. |
| 2008/0320323 | A1 | 12/2008 | Brittain et al. |
| 2009/0043991 | A1 | 2/2009 | Guo et al. |
| 2009/0049545 | A1 | 2/2009 | Nagpal et al. |
| 2009/0055580 | A1 | 2/2009 | Moscibroda et al. |
| 2009/0094478 | A1 | 4/2009 | Harper et al. |
| 2009/0216962 | A1 | 8/2009 | Mutlu et al. |
| 2009/0307691 | A1 | 12/2009 | Moscibroda et al. |
| 2010/0182624 | A1 | 7/2010 | Murakami |
| 2011/0276972 | A1 | 11/2011 | Chung et al. |
| 2011/0276974 | A1 | 11/2011 | Chung et al. |

OTHER PUBLICATIONS

Moscibroda, Thomas and Mutlu, Onur, "Memory Performance Attacks: Denial of Memory Service in Multi-Core Systems," Technical Report MSR-TR-2007-15, Proceedings of the 16th USENIX Security Symposium (USENIX Security), pp. 257-274, (21 pages), Boston, MA, Aug. 2007 URL: ftp://ftp.research.microsoft.com/pub/tr/TR-2007-15.pdf.

(Continued)

*Primary Examiner* — Qing Wu
(74) *Attorney, Agent, or Firm* — Abel Law Group, LLP

(57) ABSTRACT

In at least one embodiment, a method includes locally scheduling a memory request requested by a thread of a plurality of threads executing on at least one processor. The memory request is locally scheduled according to a quality-of-service priority of the thread. The quality-of-service priority of the thread is based on a quality of service indicator for the thread and system-wide memory bandwidth usage information for the thread. In at least one embodiment, the method includes determining the system-wide memory bandwidth usage information for the thread based on local memory bandwidth usage information associated with the thread periodically collected from a plurality of memory controllers during a timeframe. In at least one embodiment, the method includes at each mini-timeframe of the timeframe accumulating the system-wide memory bandwidth usage information for the thread and updating the quality-of-service priority based on the accumulated system-wide memory bandwidth usage information for the thread.

20 Claims, 12 Drawing Sheets

(56) References Cited

OTHER PUBLICATIONS

Rai, Idris A., et al., "Performance Analysis of LAS-based Scheduling Disciplines in a Packet Switched Network," SIGMETRICS/Performance '04, Jun. 12-16, 2004, 12 pages.

Cloud Computing, Wikipedia, downloaded Oct. 23, 2009, http://en.wikipedia.org/wiki/Cloud_computing, 12 pages.

Intel, "Intel Core i7 Processor," downloaded Oct. 23, 2009, http://www.intel.com/products/processor/corei7/specifications.htm, 2 pages.

Kim, Yoongu et al., "ATLAS: A Scalable and High-Performance Scheduling Algorithm for Multiple Memory Controllers," HPCA-16 Conference, 16th IEEE International Symposium on High-Performance Computer Architecture, Jan. 11, 2010, 12 pages.

MICRON DDR2 SDRAM, 2006, 130 pages.

Mutlu, Onur and Moscibroda, Thomas, "Parallelism—Aware Batch Scheduling: Enhancing both Performance and Fairness of Shared DRAM Systems," Proceedings of the 35th International Symposium on Computer Architecture (ISCA), Jun. 2008, 12 pages.

Mutlu, Onur and Moscibroda, Thomas, "Stall-Time Fair Memory Access Scheduling for Chip Multiprocessors," Proceedings of the 40th International Symposium on Microarchitecture (MICRO), Dec. 2007, 13 pages.

Nesbit, Kyle J. et al., "Fair Queuing Memory Systems," Proceedings of the 39th Annual IEEE/ACM International Symposium on Microarchitecture, 2006, 12 pages.

Righter, Rhonda and Shanthikumar, J. George, "Scheduling Multiclass Single Server Queueing Systems to Stochastically Maximize the Number of Successful Departures," Probability in the Engineering and Information Sciences, 1989, 3:323-333 (11 pages).

Rixner, Scott et al., "Memory Access Scheduling," ISCA-27 (2000), 11 pages.

U.S. Appl. No. 12/775,643, filed May 7, 2010, entitled "Memory Controller-Parallelism-Aware Scheduling for Multiple Memory Controllers," and naming inventors Jaewoong Chung and Debarshi Chatterjee.

Chung, Jaewoong et al., "The Common Case Transactional Behavior of Multithreaded Programs," Twelfth International Symposium on High-Performance Computer Architecture, Feb. 11-15, 2006, Austin, TX, pp. 1-12.

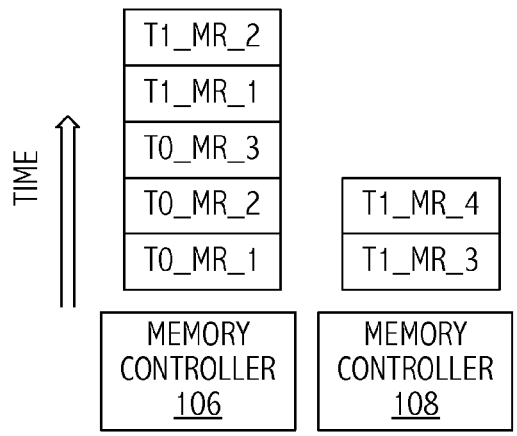
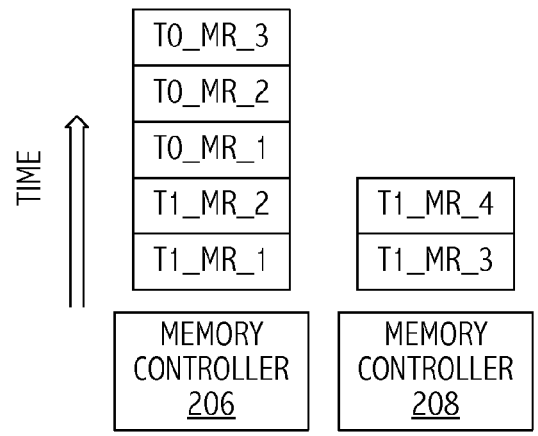
FIG. 11A  FIG. 11B
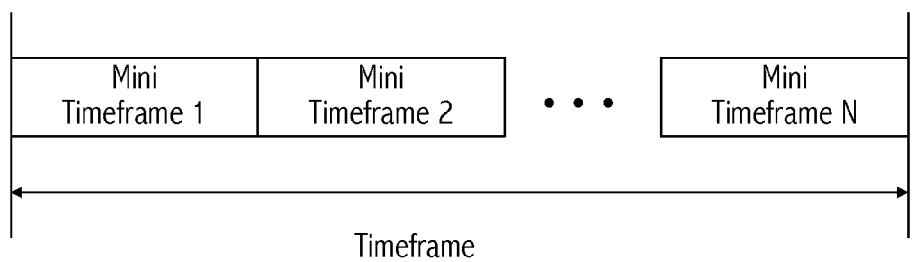
FIG. 12

METHOD AND APPARATUS FOR SCHEDULING FOR MULTIPLE MEMORY CONTROLLERS

BACKGROUND

1. Field of the Invention

The invention is related to computing systems and more particularly to multi-processor systems.

2. Description of the Related Art

In a typical computing system, a memory controller is an intermediary between a processor (e.g., central processing unit, digital signal processor, processor core, or core) and main memory (e.g., synchronous dynamic random access memory, i.e., SDRAM) that prioritizes and schedules memory requests (e.g., reads and writes from and to main memory, respectively). The memory controller schedules memory requests by prioritizing memory requests, translating the memory requests into a sequence of memory commands, and issuing to memory the sequence of memory commands associated with a highest priority memory request. A typical processing system (e.g., a chip multiprocessor system) includes multiple memory controllers and multiple memory channels for accessing main memory. Each memory controller controls a different portion of main memory. Each processor can access the portion of main memory controlled by any of the memory controllers in the system, thereby providing a large physical memory space to each processor. Accordingly, multiple processors in the multi-processor system may contend with each other for memory bandwidth. Thus, there is a need to facilitate memory request scheduling in processing systems.

SUMMARY OF EMBODIMENTS OF THE INVENTION

In at least one embodiment of the invention, a method includes locally scheduling a memory request requested by a thread of a plurality of threads executing on at least one processor. The memory request is locally scheduled according to a quality-of-service priority of the thread. The quality-of-service priority of the thread is based on a quality of service indicator for the thread and system-wide memory bandwidth usage information for the thread. In at least one embodiment, the method includes determining the system-wide memory bandwidth usage information for the thread based on local memory bandwidth usage information associated with the thread periodically collected from a plurality of memory controllers during a timeframe. In at least one embodiment, the method includes resetting the quality-of-service priority of the thread to a predetermined value at the beginning of each timeframe. In at least one embodiment, the method includes resetting the system-wide memory bandwidth usage information for the thread to zero at the beginning of each timeframe. In at least one embodiment, the method includes accumulating at each mini-timeframe of the timeframe the system-wide memory bandwidth usage information associated with the thread. In at least one embodiment, the method includes updating at each mini-timeframe of the timeframe the quality-of-service priority based on the accumulated system-wide memory bandwidth usage information for the thread.

In at least one embodiment of the invention, an apparatus includes a central manager operative to generate quality-of-service priority information associated with a plurality of threads executing on at least one processor. The quality-of-service priority information is based on local memory bandwidth usage information for each thread and a quality-of-service indicator for each thread. The apparatus includes a plurality of memory controllers operative to schedule memory requests associated with the plurality of threads based on the quality-of-service priority information associated with the plurality of threads.

In at least one embodiment of the invention, a method of operating a multi-core system includes locally scheduling a memory request associated with a first thread of a plurality of threads executing on at least one processor. The locally scheduling includes using a system memory bandwidth less than a predetermined quality-of-service for the thread. The locally scheduling is in response to a second thread of the plurality of threads using a system memory bandwidth that exceeds a predetermined quality-of-service for the thread. The method includes scheduling the memory request using another scheduling rule, otherwise.

BRIEF DESCRIPTION OF THE DRAWINGS

The present invention may be better understood, and its numerous objects, features, and advantages made apparent to those skilled in the art by referencing the accompanying drawings.

FIG. 11 illustrates exemplary timing diagrams for a technique for scheduling memory requests and a technique for scheduling memory requests consistent with at least one embodiment of the invention.

FIG. 12 illustrates timing diagrams for a time-frame-based quality-of-service scheduling technique consistent with at least one embodiment of the invention.

The use of the same reference symbols in different drawings indicates similar or identical items.

DETAILED DESCRIPTION

Figure 1:
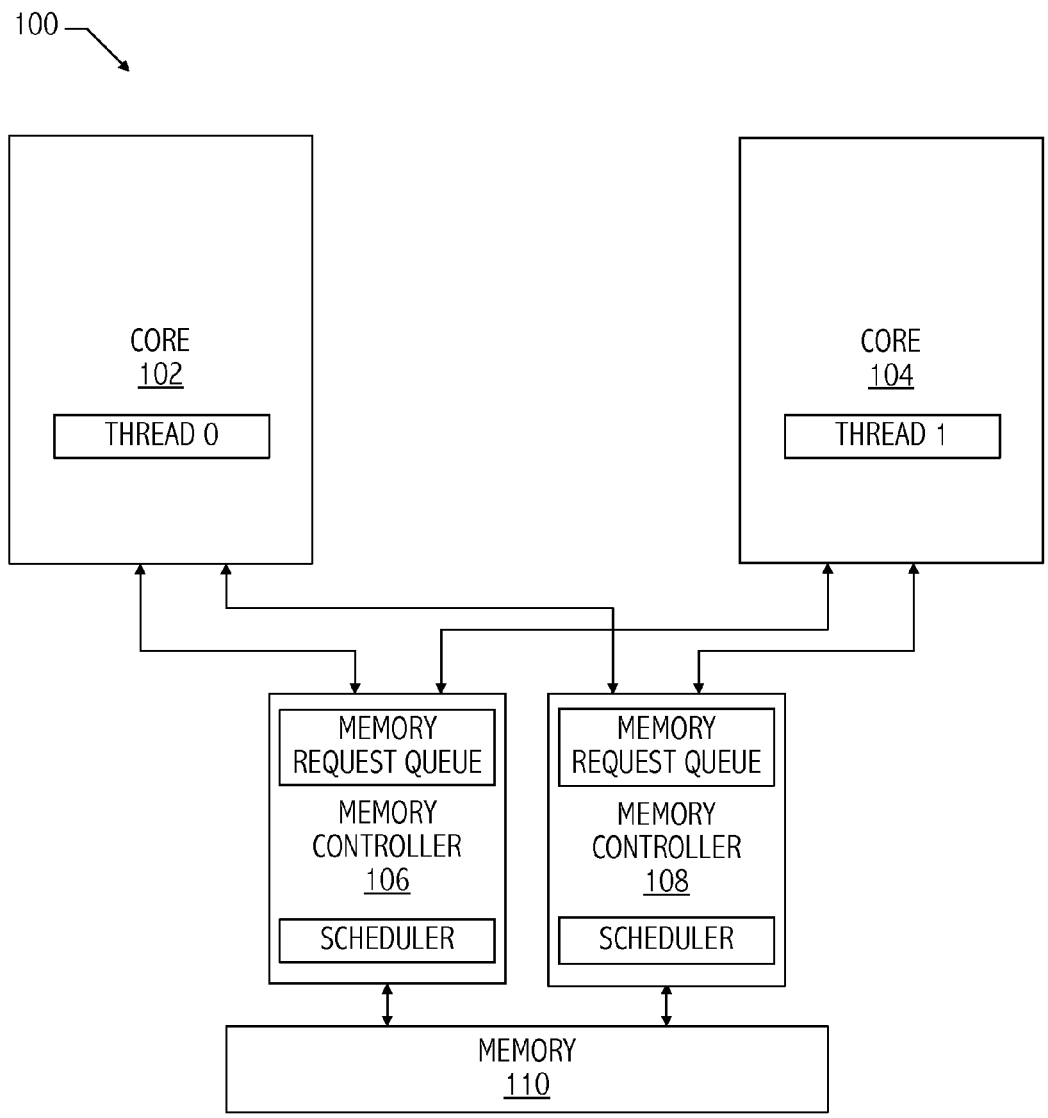
FIG. 1 illustrates a functional block diagram of an exemplary processing system.

Referring to FIG. 1, in an exemplary processing system (e.g., system 100), multiple threads (e.g., thread 0 and thread 1) execute on the system concurrently. A plurality of memory controllers (e.g., memory controller 106 and memory controller 108) provides processor (e.g., core 102 and core 104) access to a memory space (e.g., memory 110). Accordingly, each processor communicates with each memory controller. Each of memory controllers 106 and 108 provides the processors access to a particular portion of memory 110. Memory controllers 106 and 108 store memory requests received from cores 102 and 104 in memory request queues. Schedulers of memory controllers 106 and 108 each schedule memory requests received from thread 0 and thread 1 and stored in the memory request queues to corresponding portions of memory 110.

Figure 2:
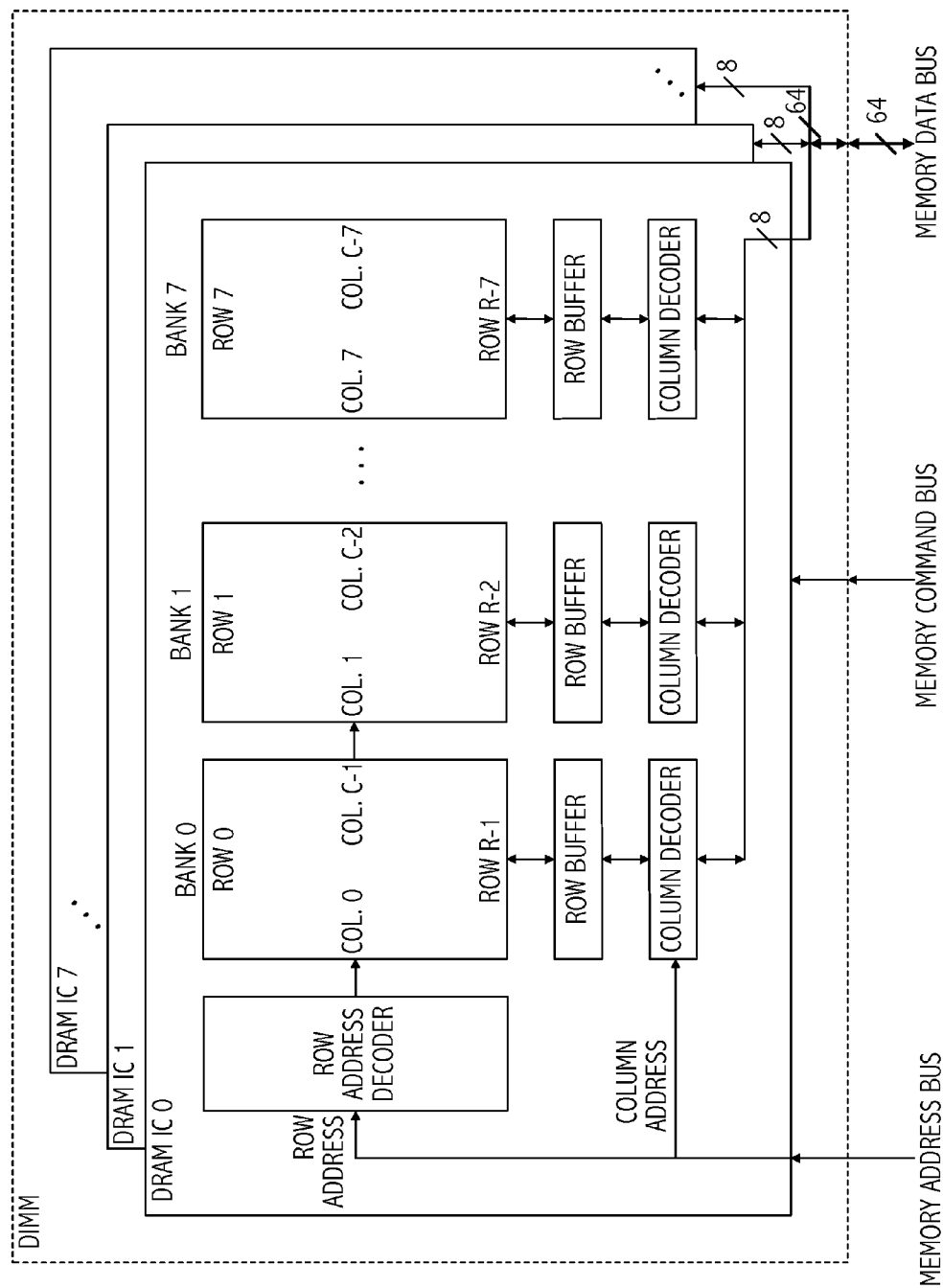
FIG. 2 illustrates a functional block diagram of an exemplary memory system consistent with at least one embodiment of the invention.

Referring to FIG. 2, an exemplary memory system includes one or more memory integrated circuits (e.g., one or more DRAM integrated circuits). In at least one embodiment, the memory system includes multiple memory integrated circuits, which are accessed in parallel (e.g., configured as a dual in-line memory module, i.e., DIMM). In at least one embodiment of the memory system, each memory integrated circuit includes a data interface (e.g., 8-bit data interface) that is combined with data interfaces of other memory integrated circuits to form a wider data interface (e.g., 64-bit data interface). In at least one embodiment of the memory system, each memory integrated circuit includes multiple independent memory banks, which can be accessed in parallel. In at least one embodiment of the memory system, each memory bank includes a two-dimensional array of DRAM (i.e., dynamic random access memory) cells, including multiple rows and columns. A location of the memory is accessed using a memory address including bank, row, and column fields. In at least one embodiment of the memory system, only one row in a bank can be accessed at a time and the row data is stored in a row buffer dedicated to that bank. An activate command moves a row of data from the memory array into the row buffer. Once a row is in the row buffer, a read or write command can read/write data from/to the associated memory address. Thus, the latency of a memory command depends on whether or not a corresponding row is in a row buffer of an associated memory bank.

If the contents of a memory address are in the row buffer (i.e., the memory address hits the row buffer), then a memory controller only needs to issue a read or write command to the memory bank, which has a memory access latency of $t_{CL}$ or $t_{WL}$, respectively. If the contents of the memory address are not present in the row buffer (i.e., the memory address misses the row buffer), then the memory controller needs to precharge the row buffer, issue an activate command to move a row of data into the row buffer, and then issue a read or write command to the memory bank, which has an associated memory access latency of $t_{RCD}+t_{CL}+t_{RP}$ or $t_{RCD}+t_{WL}+t_{RP}$, respectively. Note that the memory architecture of FIG. 2 is exemplary only and the teachings described herein apply to systems including other memory architectures.

Figure 3A:
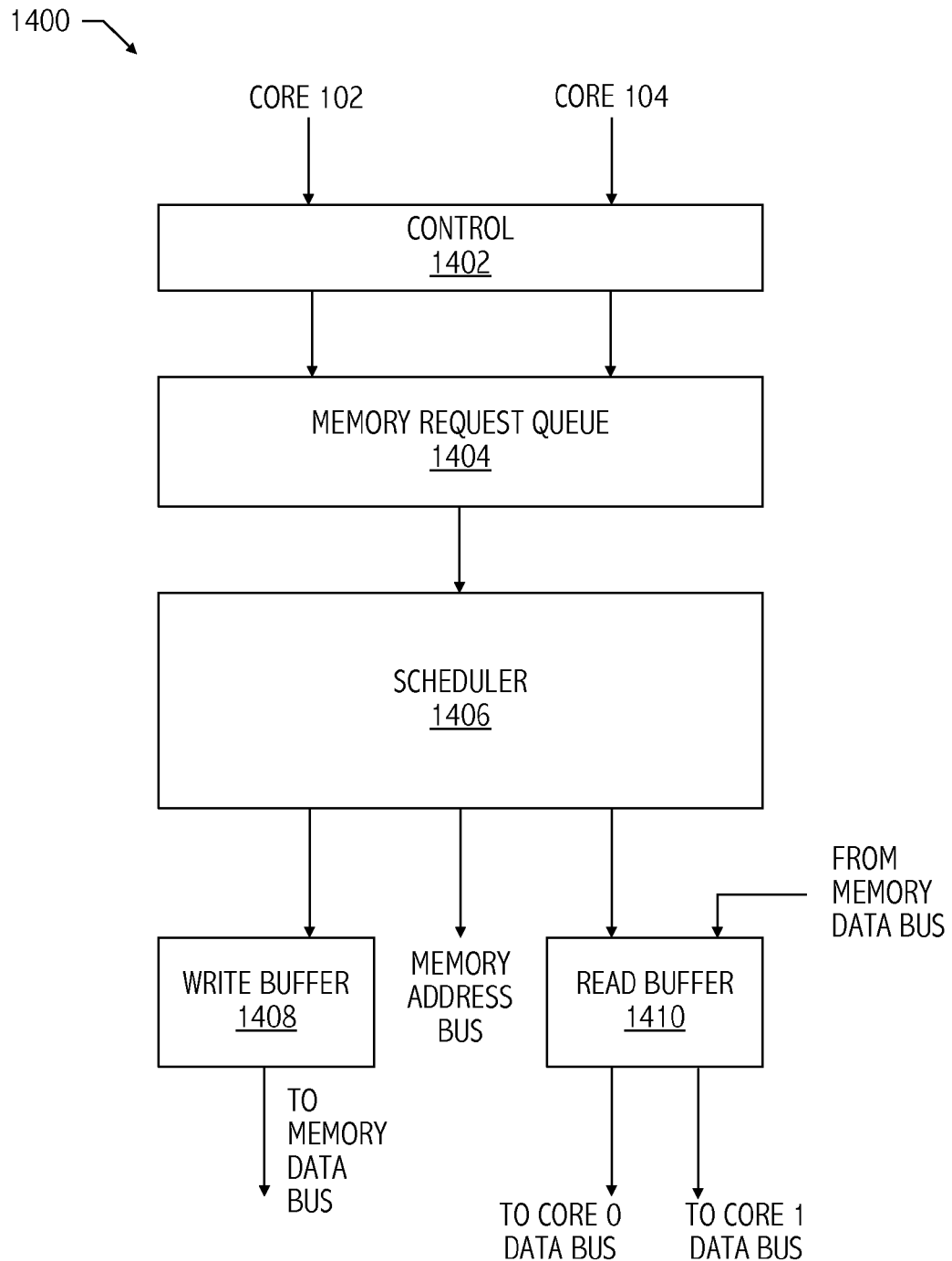
FIGS. 3A and 3B illustrate functional block diagrams of exemplary memory controllers consistent with various embodiments of the invention.
Figure 3B:
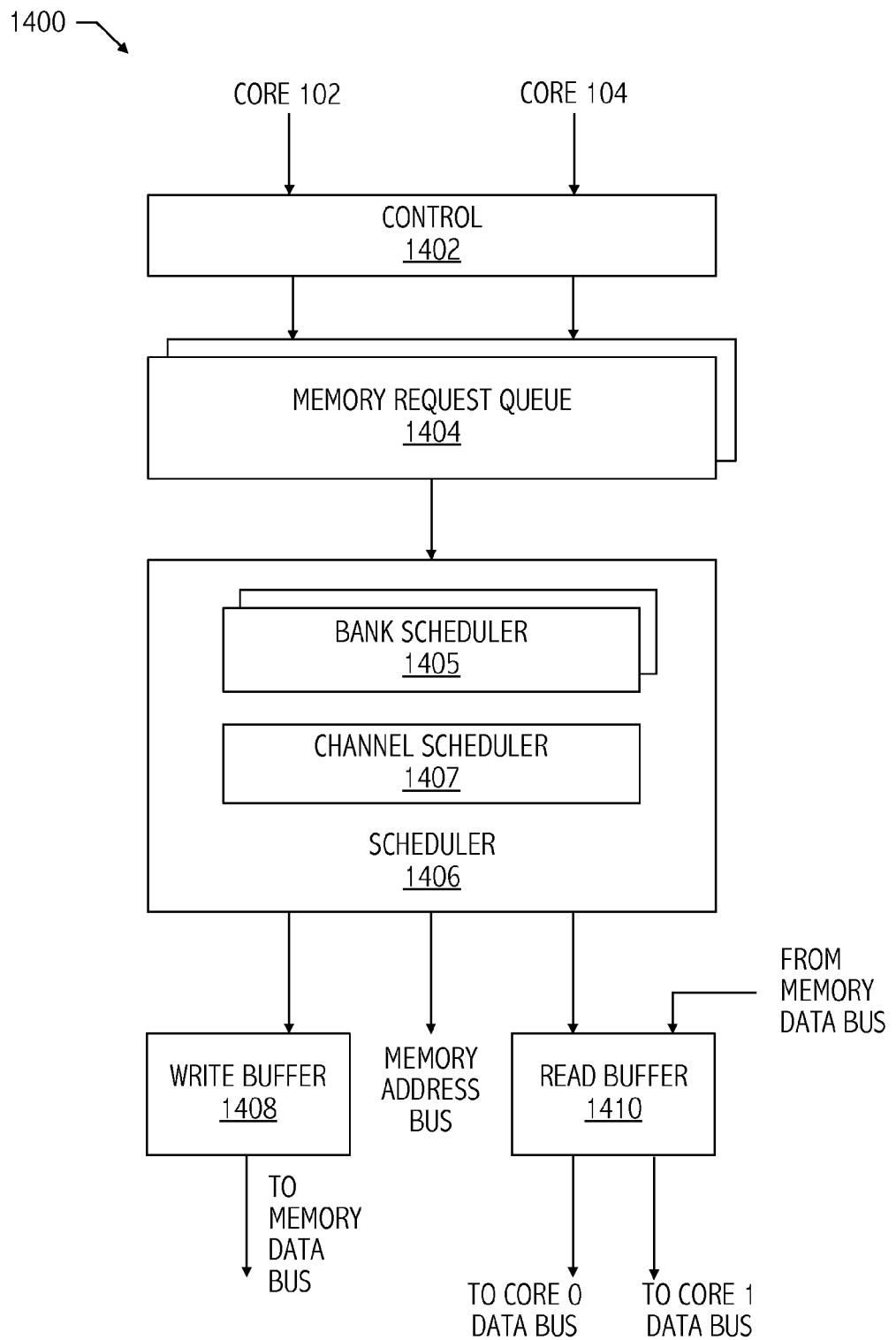

Referring to FIGS. 3A and 3B, an exemplary memory controller (e.g., memory controller 1400) receives memory requests from core 102 and core 104. Control circuit 1402 assigns an arrival time to each memory request and stores the arrival time with the memory request (e.g., request type and request identifier) in memory request queue 1404. Scheduler 1406 prioritizes the memory requests and schedules the memory requests by reordering the memory requests into one or more sequences of memory commands based on the priorities. Scheduler 1406 sequentially executes the memory commands via a memory address bus and a memory data bus. Referring to FIG. 3B, in at least one embodiment, the portion of memory serviced by memory controller 1400 includes multiple memory banks, memory request buffer 1404 includes a request buffer for memory requests corresponding to each memory bank, and scheduler 1406 includes a bank scheduler for each memory bank (e.g., bank schedulers 1405) and a channel scheduler (e.g., channel scheduler 1407).

Still referring to FIG. 3B, in at least one embodiment of memory controller 1400, a bank scheduler 1405 selects pending memory requests with the highest priority from a corresponding memory request queue and generates a sequence of memory commands to read or write the request data to or from the memory, respectively. In at least one embodiment, bank scheduler 1405 monitors timing constraints for a corresponding memory bank to ensure that a sequence of memory commands complies with memory specifications. If a memory command is ready with respect to the memory specifications, then bank scheduler 1405 sends the command to channel scheduler 1407. In at least one embodiment, channel scheduler 1407 reorders and/or interleaves memory requests in priority order (e.g., highest priority commands first) from each of the bank schedulers 1405 into memory commands, which are issued on the memory address bus and signal write buffer 1408 and read buffer 1410. Channel scheduler 1407 sends an acknowledgement to a corresponding bank scheduler 1405 when channel scheduler 1407 issues a memory command and bank scheduler 1405 updates a state accordingly. Channel scheduler 1407 also monitors the state of the memory address and data buses and bank timing constraints to reduce or eliminate channel scheduling conflicts and timing constraint violations.

In at least one embodiment of memory controller 1400, bank schedulers 1405 and channel scheduler 1407 use the same priority policies. Referring to FIG. 3A, in at least one embodiment, memory controller 1400 services only one memory bank and scheduler 1406 does not include bank schedulers 1405 and channel scheduler 1407. Accordingly, as referred to herein, a "scheduler" is any one of a bank scheduler, a channel scheduler, a scheduler from a memory controller servicing only one memory bank, or other suitable memory request scheduler unless otherwise specified. In addition, note that memory controller 1400 of FIG. 3A and memory controller 1400 of FIG. 3B are exemplary only and techniques described herein are applicable to other memory controller architectures.

Figure 4A:
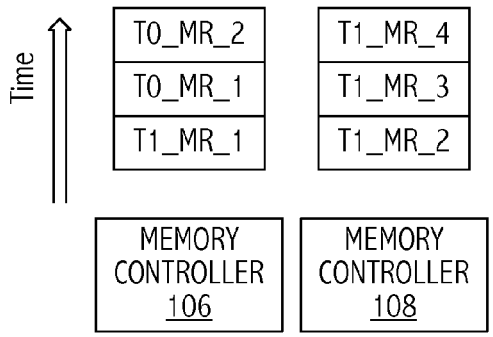
FIGS. 4A and 4B illustrate timing diagrams of uncoordinated memory request scheduling and coordinated memory request scheduling in a processing system.

Referring to FIG. 4A, an exemplary scheduling technique schedules memory requests from core 102 and core 104 using a shortest-job-first (i.e., shortest-remaining-time) rule. Each of memory controllers 106 and 108 measures a job length of each thread by counting a number of outstanding memory requests from each thread in a memory request queue of a corresponding memory controller. Then, the memory controller prioritizes the memory requests of the thread having the shortest job length (i.e., the smallest number of requests) higher than memory requests of threads having longer job lengths and thus schedules the memory requests of the thread having the shortest job length before other memory requests. Each of memory controllers 106 and 108 applies shortest-job-first scheduling locally, without coordinating with the other one of memory controllers 108 and 106, respectively. For example, the memory request queue of memory controller 106 includes two memory requests from thread 0 and one memory request from thread 1. The memory request queue of memory controller 108 contains three memory requests from thread 1. Memory controller 106 schedules the one request from thread 1 first (i.e., the shortest job from the local perspective of memory controller 106) and then schedules the two requests from thread 0 while memory controller 108 schedules the three requests from thread 1. The memory requests for thread 0 complete after three memory cycles and the memory requests for thread 1 complete after three memory cycles, resulting in an average memory response time of three memory cycles.

Other scheduling techniques (e.g., first-ready, first-come, first-served scheduling (FRFCFS), stall-time fair memory access scheduling, and parallelism-aware batch scheduling) improve scheduling locally, i.e., scheduling on a single memory controller basis. For example, a FRFCFS rule locally prioritizes ready memory commands over memory commands that are not ready, locally prioritizes SDRAM column address strobe (CAS) commands over SDRAM row address strobe (RAS) commands, and locally prioritizes commands with earliest arrival times. Parallelism-aware batch scheduling groups memory requests in batches locally and executes the memory requests batch-by-batch. The scheduling technique locally schedules memory requests according to a shortest-job-first rule applied to the batches. Stall-time fair memory access scheduling distributes memory bandwidth of a memory controller in a way to equally slow down threads executing concurrently.

Figure 5:
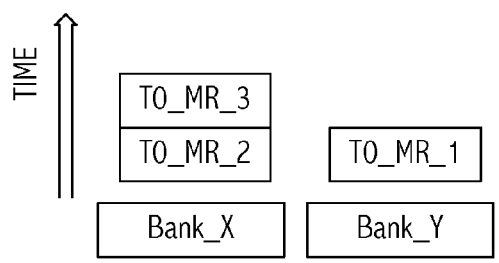
FIG. 5 illustrates an exemplary timing diagram for memory request scheduling using a congested-bank-first rule consistent with at least one embodiment of the invention.

Referring to FIG. 5, in a processing system including memory controllers that each serves multiple memory banks, the congested-bank-first rule locally schedules first requests to the most congested bank served by a memory controller, i.e., requests in a critical path for a thread's memory requests. Memory requests to other banks are issued at idle cycles of another memory channel while the most congested bank executes the requests. Thread 0 sends three memory requests (e.g., T0_MR_1, T0_MR_2, and T0_MR_3, in arrival order) to memory controller 106, followed by two memory requests from thread 1. If all of these memory requests miss a row buffer, without a congested-bank-first rule, those requests are handled according to a first-come, first-served policy. Accordingly, memory request T0_MR_1 is scheduled first, followed by memory requests T0_MR_2 and T0_MR_3. However, memory requests T0_MR_2 and T0_MR_3 are in the critical path for thread 0. Using the congested-bank-first rule, memory request T0_MR_2 is scheduled first. While memory request T0_MR_2 executes (e.g., during an SDRAM activate command that opens a row of an SDRAM for a read or write command), memory request T0_MR_1 executes in parallel. After memory request T0_MR_2 completes, memory request T0_MR_3 executes. Processing time of memory request T0_MR_3 may overlap with processing of memory request T0_MR_1. Thus, a congested-bank-first rule gives priority to those memory requests in a critical path (operating on a most-congested memory bank).

Figure 4B:
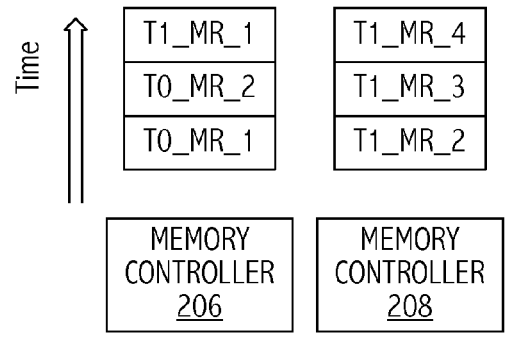

Referring back to FIG. 4B, coordinating memory request scheduling system-wide reduces the average memory response time of memory requests from the results of uncoordinated scheduling. In at least one embodiment of a system-wide scheduling mechanism, memory controllers (e.g., memory controllers 206 and 208) coordinate memory request scheduling by exchanging information regarding the number of memory requests from thread 0 and thread 1 in the memory request queues. Accordingly, for the memory requests of FIG. 4A, a system-wide scheduling technique identifies two memory requests from thread 0 and four memory requests from thread 1. Since the total number of outstanding memory requests for thread 0 is less than the total number of outstanding memory requests for thread 1, the system-wide scheduling technique schedules the two memory requests from thread 0 first, followed by the one memory request from thread 1, resulting in memory requests of thread 0 finishing after two memory cycles and memory requests of thread 1 finishing after three memory cycles, for an average memory response time of two and a half memory cycles. Thus, the system-wide scheduling technique reduces the average memory response time for those memory accesses from three memory cycles, as described above with reference to FIG. 4A.

Figure 6:
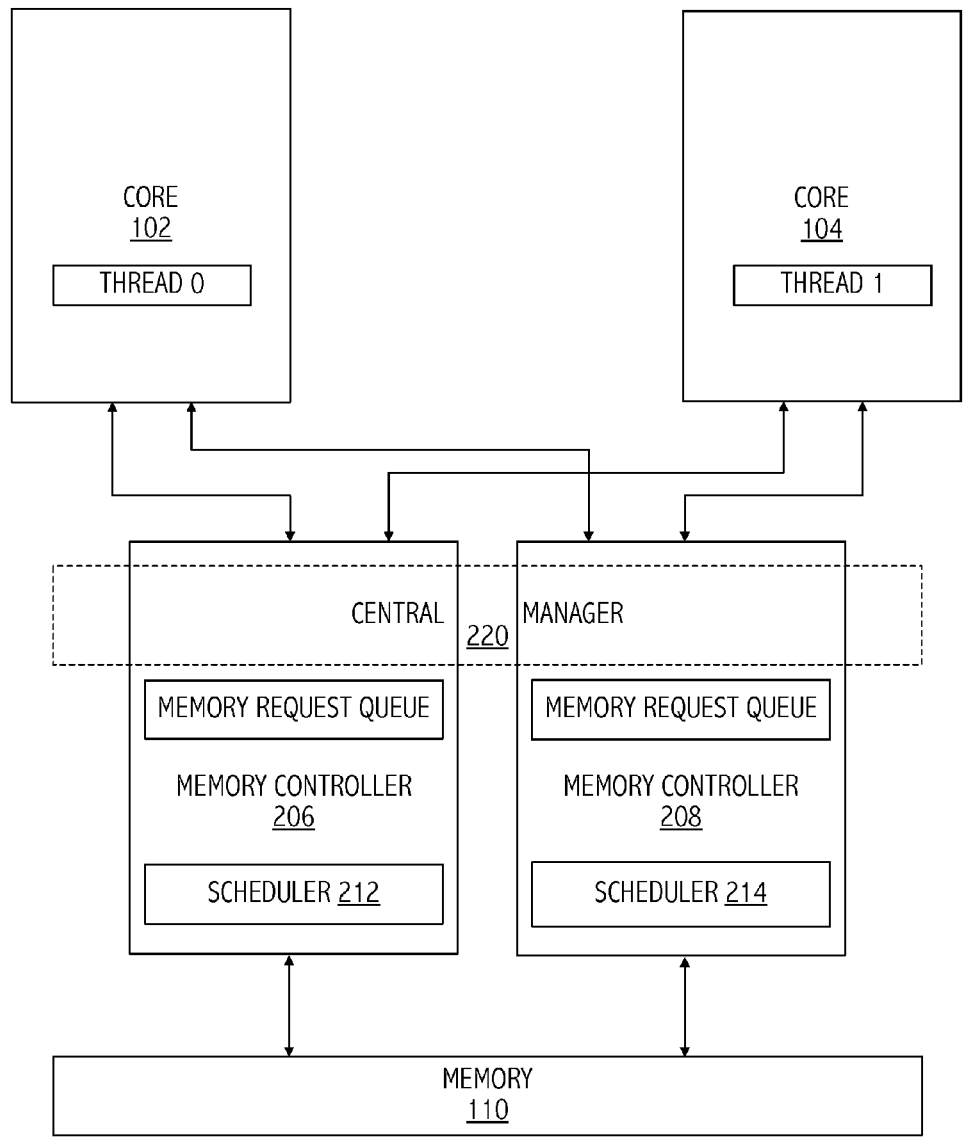
FIG. 6 illustrates a functional block diagram of an exemplary processing system including a system-wide scheduling mechanism including a distributed central manager and local schedulers consistent with at least one embodiment of the invention.
Figure 7:
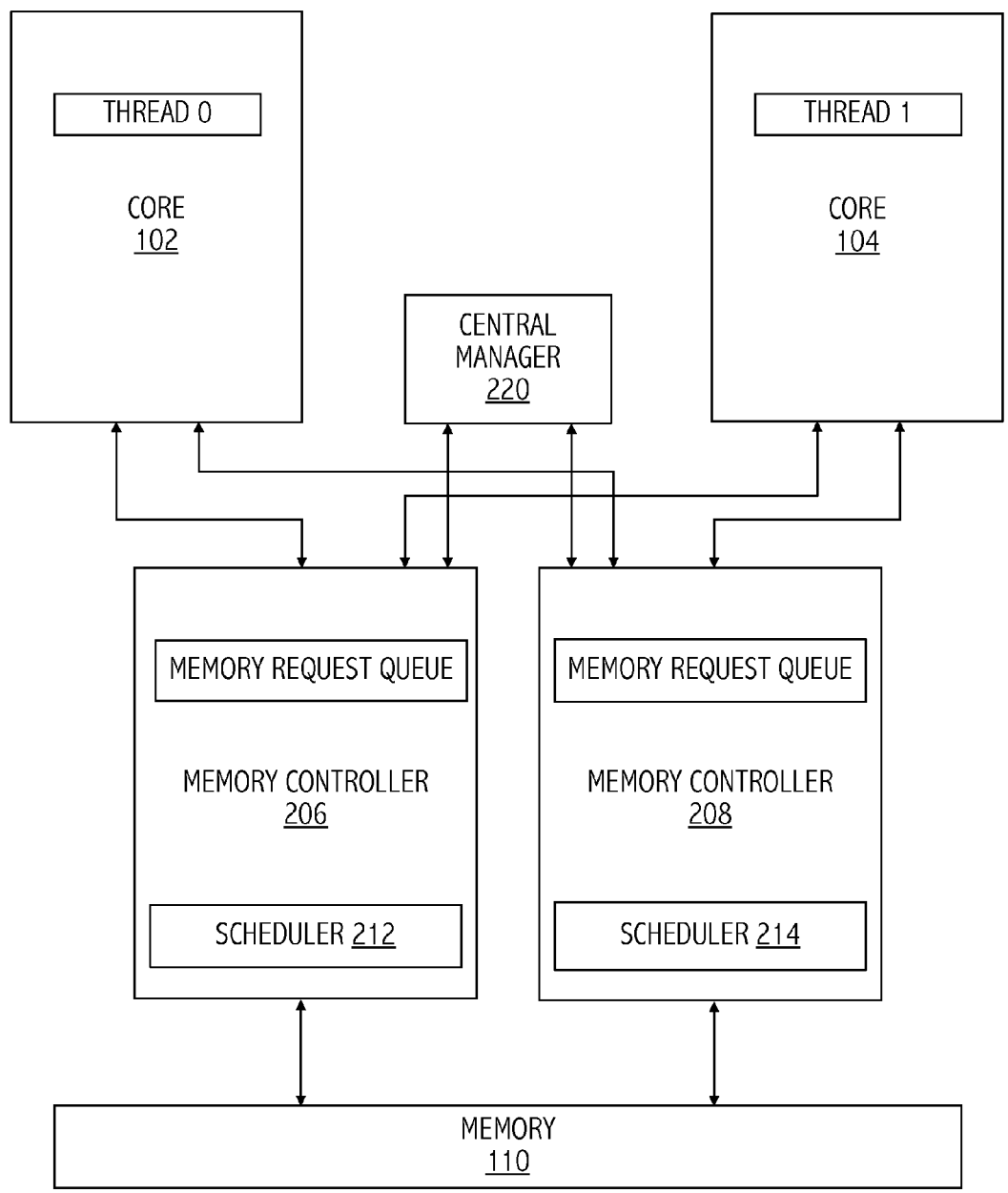
FIG. 7 illustrates a functional block diagram of an exemplary processing system including a system-wide scheduling mechanism including a central manager and local schedulers consistent with at least one embodiment of the invention.

Referring to FIGS. 6 and 7, in at least one embodiment of a system-wide scheduling technique, a central manager (e.g., central manager 220) communicates with memory controllers 206 and 208. Referring to FIG. 6, in at least one embodiment of the system-wide scheduling technique, the central manager is distributed over multiple memory controllers, e.g., memory controller 206 and memory controller 208 each implement a portion of the central manager functions. Referring to FIG. 7, in another embodiment of the system-wide scheduling technique, central manager 220 is an independent module, which includes dedicated hardware, and/or instructions executing on a microcontroller or other general purpose processing system. Note that the multi-processor systems of FIGS. 6 and 7 are exemplary only and other processing systems consistent with the teachings herein may include a different number of processors and/or memory controllers.

Memory-Controller-Parallelism-Aware Scheduling

Figure 8:
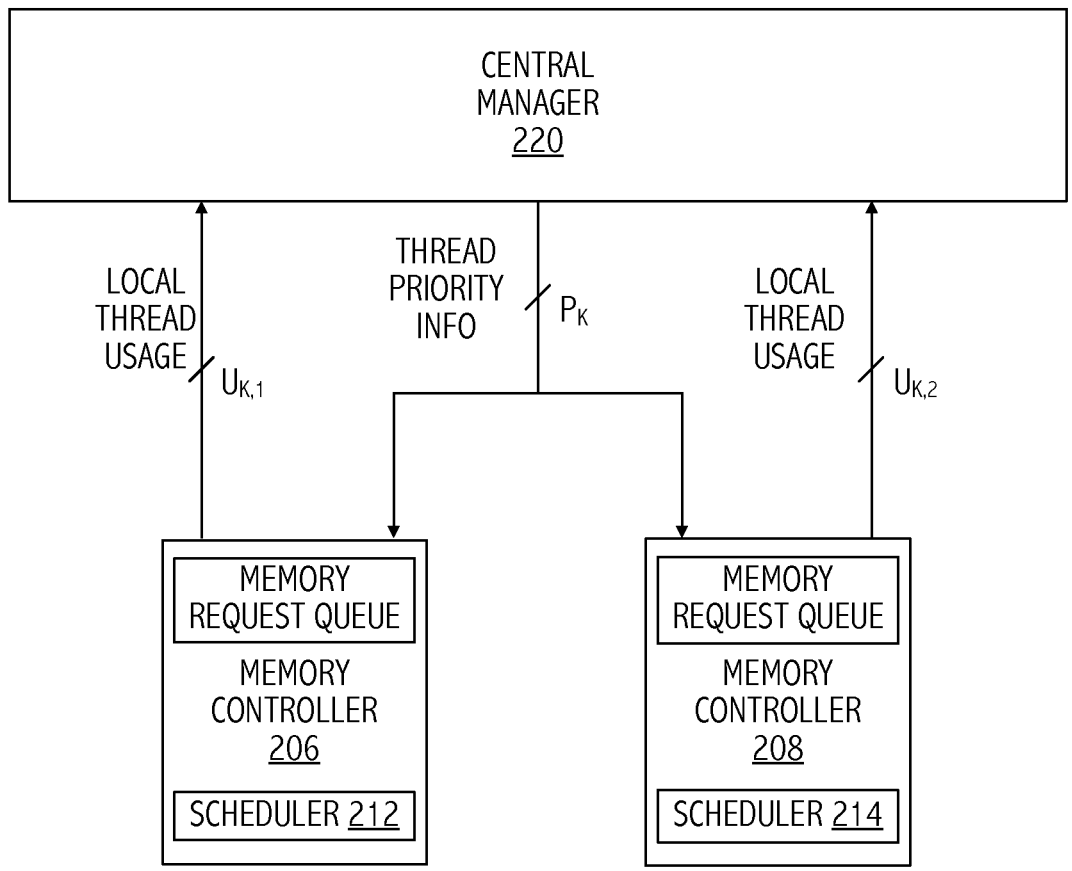
FIG. 8 illustrates information flows between an exemplary central manager and memory controllers consistent with at least one embodiment of the invention.

Referring to FIG. 8, in at least one embodiment of a memory-controller-parallelism-aware scheduling technique, memory controllers (e.g., scheduler 212 and scheduler 214 of memory controller 206 and memory controller 208, respectively) prioritize and schedule memory requests according to a least-attained service rule. Central manager 220 collects information regarding local memory bandwidth usage from memory controllers 206 and 208 over long intervals (e.g., one million memory cycles). In at least one embodiment of the memory-controller-parallelism-aware scheduling technique, the collection interval is programmable. The collected information (e.g., $U_{K,1}$ and $U_{K,2}$ for first and second memory controllers 206 and 208, respectively, where K is the number of concurrently executing threads) includes for each individual thread in a memory request queue of a memory controller, a number of memory cycles used to service memory requests of the thread over an interval. Based on the collected information, central manager 220 identifies which memory controller serves a particular thread for the longest time and predicts the job length of that thread based on the number of memory cycles used by the identified memory controller during the interval. In at least one embodiment of the memory-controller-parallelism-aware scheduling technique, the predicted job length of a particular thread is proportional or equal to the maximum number of memory cycles used to serve that particular thread at any one of the memory controllers. Central manager 220 then ranks (i.e., prioritizes) the threads according to the predicted job lengths. In at least one embodiment, central manager 220 assigns a higher priority to a thread having a shorter job length than another thread, which is assigned a lower priority. Central manager 220 communicates the priority (i.e., rank) information (e.g., $P_M$, where M is the number of concurrently executing threads) for each thread to each of the memory controllers serving those threads.

In at least one embodiment of the memory-controller-parallelism-aware scheduling technique, each of memory controllers 206 and 208 receives the thread priority information from central manager 220. Then, schedulers in memory controllers 206 and 208 (i.e., schedulers 212 and 214) locally prioritize and schedule memory requests for the threads according to the thread priority information without further communication with central manager 220. In at least one embodiment, schedulers 212 and 214 schedule memory requests for a higher ranking thread before memory requests for a lower ranking thread.

Figure 9:
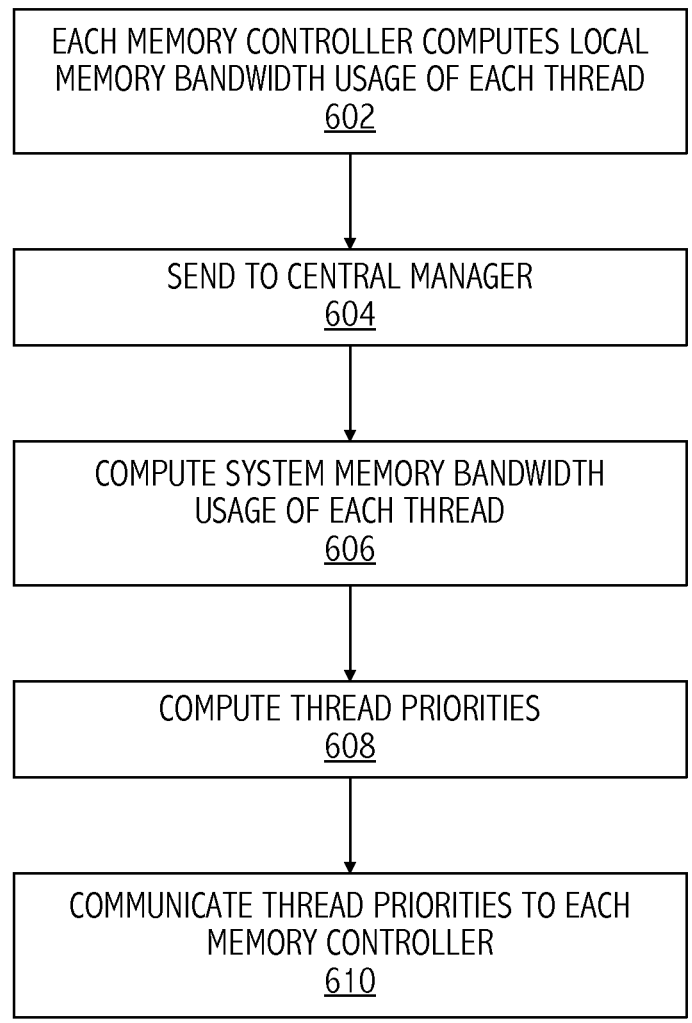
FIG. 9 illustrates information and control flows for generating priority information and providing priority information to multiple memory controllers consistent with at least one embodiment of the invention.

Referring to FIG. 9, in at least one embodiment of the memory-controller-parallelism-aware scheduling technique, an individual memory controller determines a local memory bandwidth usage of each thread independently (602). The number of threads executing concurrently in a system (i.e., K) equals the number of processors times the number of hardware thread contexts supported per processor. In at least one embodiment of a multi-core system, at least one processor supports simultaneous multithreading and the number of hardware contexts is greater than one. Accordingly, in at least one embodiment of the memory-controller-parallelism-aware scheduling technique, at a particular memory cycle, the local memory bandwidth usage of thread k for a memory controller m ($U_{k,m}$) is incremented (i.e., $U_{k,m}=U_{k,m}+1$) if the memory controller issues a memory command (e.g., activate, read, write, or precharge) for a memory request from a thread k. At a particular memory cycle, the local memory bandwidth usage of thread k from a memory controller m ($U_{k,m}$) is increased by 1/N (i.e., $U_{k,m}=U_{k,m}+1/N$) if a memory command (e.g., activate, read, write, or precharge) is not issued at the particular memory cycle, but there is an outstanding memory request for thread k in the memory request queue, where N is the number of total outstanding memory requests in the memory request queue at the particular memory cycle. This latter rule effectively allocates shares of the memory cycle to all threads with outstanding memory requests in the memory request queue of the memory controller.

In at least one embodiment of the memory-controller-parallelism-aware scheduling technique, to reduce computation complexity, memory controllers 206 and 208 increment $U_{k,m}$ by an integer constant C (i.e., $U_{k,m}=U_{k,m}+C$, e.g., C=10) for the former rule and increase $U_{k,m}$ by C/N (i.e., $U_{k,m}=U_{k,m}+C/N$) for the latter rule. At the end of each interval, each memory controller sends its local memory bandwidth usage information to central manager 220. Central manager 220 collects the local memory bandwidth usages $U_{k,m}$ sent from the memory controllers (604) and determines the system-wide memory bandwidth usage of thread k (i.e., $U_k$) for an interval as $U_k$=MAX ($U_{k,m}$, for m=1 to M, where M is the number of memory controllers in the system) (606).

In at least one embodiment of a memory-controller-parallelism-aware scheduling technique, central manager 220 sorts the computed system-wide memory bandwidth usages, $U_k$, and assigns the highest priority to the one or more threads with the smallest system-level memory bandwidth usage, and assigns next highest priorities to threads with increasing system-level memory bandwidth usage $U_k$ (608). Then, central manager 220 distributes the thread priority information to the individual memory controllers (610).

Figure 10:
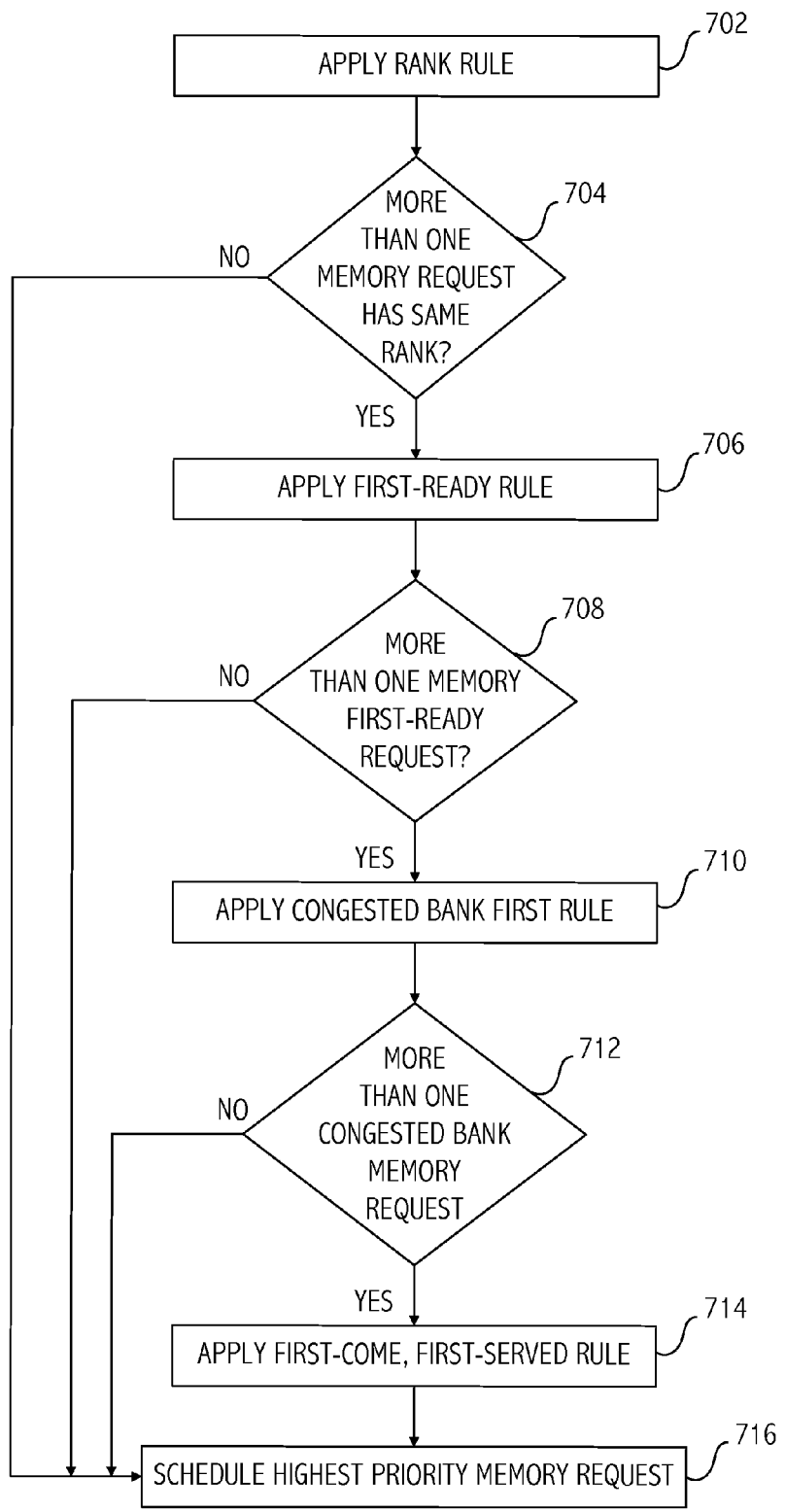
FIG. 10 illustrates information and control flows for a memory-controller-parallelism-aware scheduling mechanism consistent with at least one embodiment of the invention.

Referring to FIG. 10 in at least one embodiment of a memory-controller-parallelism-aware scheduling technique, an individual memory controller schedules memory requests by first applying a rank rule, i.e., the memory controller schedules a memory request of a thread with a higher priority before a memory request of a thread with a lower priority (702). In at least one embodiment of the memory-controller-parallelism-aware scheduling technique, if multiple memory requests are associated with the same priority under the rank rule (704), then the memory controller applies a first-ready rule, i.e., a memory request that hits a row buffer is given higher priority over a memory request that misses a row buffer (706). In at least one embodiment of a memory-controller-parallelism-aware scheduling technique, if two or more memory requests associated with the same priority under the rank rule also have the same priority under the first-ready rule (708), then the memory controller applies a congested-bank-first rule, i.e., a memory request to a memory bank that has a longer backlog of pending memory requests from the same thread are given higher priority over a memory request to a bank with a shorter backlog of memory requests (710). In at least one embodiment of a memory-controller-parallelism-aware scheduling technique, if two or more memory requests that have the same priority under the rank rule also have the same priority under the first-ready rule and the congested-bank-first rule (712), then the memory controller applies a first-come, first-served rule, i.e., a memory request received earlier is prioritized over a memory request received later (714). Once memory controller identifies the memory request associated with the highest priority, the memory controller schedules the associated memory access (716).

The rank rule described above ensures that the thread predicted to have the shortest job length is served first, which takes advantage of a faster average response time of a shortest-job-first rule. In addition, since individual memory controllers prioritize applications with the same sequence of scheduling rules, requests from the same thread tend to be scheduled concurrently by the memory controllers, which increases the memory-controller-level parallelism of the thread. Note that by applying the rank rule first, the memory controller applies the remainder of the scheduling rules to memory requests from the same thread. Note that the type and sequence of scheduling rules applied after the rank rule may vary in other embodiments of the memory-controller-parallelism-aware scheduling technique.

Determination of system-wide memory bandwidth usage of thread k (i.e., $U_k$) in the timeframe as the maximum of the local memory bandwidth usages of a thread k at each memory controller (i.e., $U_k$=MAX ($U_{k,m}$, for m=1 to M, where M is the number of memory controllers), as described above yields improved results as compared to other techniques for determining system-wide memory bandwidth usage under some circumstances. For example, referring to FIGS. 11A and 11B, thread 0 sends three requests to memory controller 106 and thread 1 sends two requests to memory controller 106 and two requests to memory controller 108. Referring to FIG. 11A, a central manager calculates system-wide memory bandwidth usage of thread k by summing the local memory bandwidth usages of thread k at each memory controller m (i.e., $U_k=\Sigma_{m=1}^{M}U_{k,m}$, where M is the number of memory controllers), and the system-wide memory bandwidth usage for thread 0 is three (i.e., $U_0$=3+0) and the system-wide memory bandwidth usage for thread 1 is four (i.e., $U_1$=2+2) and central manager 220 assigns a higher priority to thread 0 and communicates the thread priority information to memory controller 106 and memory controller 108, which schedule the memory requests based on that priority information. As a result, thread 0 finishes after three cycles and thread 1 finishes after five cycles and the system has an average response time of four cycles.

Referring to FIG. 11B, central manager 220 determines a system-wide memory bandwidth usage of thread k (i.e., $U_k$) in the timeframe as the maximum of the local memory bandwidth usages of a thread k at each memory controller i.e., $U_k = \text{MAX}(U_{k,m}$, for m=1 to M, where M is the number of memory controllers). Central manager 220 determines that the system-wide memory bandwidth usage for thread 0 is 3 ($U_0 = \text{MAX}(3,0)$) and the system-wide memory bandwidth usage for thread 1 is 2 ($U_1 = \text{MAX}(2,2)$) and assigns a higher priority to thread 1 and communicates the thread priority information to memory controller 106 and memory controller 108, which schedule the memory requests based on that priority information. Accordingly, thread 0 finishes after five memory cycles and thread 1 finishes after two memory cycles and the system has an average response time of 3.5 memory cycles, which is shorter than the average response time of the system of FIG. 11A, which uses the other technique for determining system-wide memory bandwidth usage of a thread.

Time-Frame-Based Quality-of-Service Scheduling

Referring back to FIG. 1, system 100 includes multiple memory controllers with multiple memory channels, which increases the available memory bandwidth, but also increases the complexity of supporting a target system quality-of-service (i.e., QoS). As referred to herein, quality-of-service is the ability to guarantee a particular level of memory bandwidth to a thread executing on one of the plurality of processors of a processing system. In an exemplary multi-tenant environment of cloud computing, multiple applications from multiple tenants share a processing system. The tenants lease an amount of computing resources required by their applications and a cloud computing service provider allocates to the applications resources from the shared processing system according to amounts that the tenants pay. Processing systems that use typical quality-of-service scheduling to schedule memory requests according to a target quality-of-service and local memory bandwidth usage information will not realize the full available memory bandwidth for a target quality-of-service.

For example, still referring to FIG. 1, in an exemplary application, two threads (e.g., thread 0 and thread 1) execute on cores 102 and 104, respectively, and each of memory controllers 106 and 108 supports 50% of the overall system memory bandwidth. Thread 0 and thread 1 do not use memory controllers 106 and 108 evenly (i.e., thread 0 and thread 1 do not each use 50% of each of the memory controllers bandwidth). Instead, thread 0 demands 40% of system memory bandwidth from memory controller 106 and 10% of system memory bandwidth from memory controller 108. Meanwhile, thread 1 demands 10% of system memory bandwidth from memory controller 106 and 40% of system memory bandwidth from memory controller 108. The target quality-of-service for each application is 50% of system memory bandwidth. Using local quality-of-service scheduling based on local memory bandwidth usage information, memory controller 106 will assign a priority to thread 0 that indicates thread 0 is overutilizing memory bandwidth of memory controller 106 and memory controller 108 will assign a priority to thread 1 that indicates thread 1 is overutilizing memory bandwidth of memory controller 108, even though threads 0 and 1 evenly use the system memory bandwidth (e.g., 40% of bandwidth of memory controller 106+ 10% of bandwidth of memory controller 108=50% of system memory bandwidth used by thread 0 and 10% of bandwidth of memory controller 106+40% of bandwidth of memory controller 108=50% of system memory bandwidth used by thread 1). If memory controllers 106 and 108 locally schedule memory requests based on this local memory bandwidth information, the memory controllers enforce quality-of-service individually by penalizing an apparently overutilizing thread from the perspective of the memory controller (e.g., by lowering scheduling priorities of memory requests associated with overutilizing threads). As a result, memory controller 106 slows down the execution of thread 0 and memory controller 108 slows down the execution of thread 1, which are unnecessary to achieve the target quality-of-service.

A fair queuing memory scheduling technique assigns memory bandwidth based on a predetermined share of memory bandwidth. The technique determines a virtual finish time of a memory request based on a per-thread virtual clock that progresses slower than a real memory clock according to the thread share of memory bandwidth. The scheduler in the memory controller prioritizes a memory request with an earlier virtual finish time over a memory request with a later virtual finish time. Accordingly the memory controller provides the illusion that the thread runs with a slower, but dedicated memory controller. For example, the scheduler handles memory requests for a thread with a predetermined share of memory bandwidth of 50% as if it is running with a dedicated memory controller with a clock half as fast as the actual memory clock. However, this technique will not provide the predetermined thread allocation share of memory bandwidth if other scheduling criterion (e.g., row-buffer-hit scheduling) are used to prioritize memory requests before applying fair-queuing memory scheduling or if error is introduced into the priority determination by inaccurate virtual time calculations.

In at least one embodiment, processing system 200, described above with reference to FIGS. 6-8, implements a system-wide memory request scheduling technique that provides quality-of-service scheduling, e.g., a time-frame-based quality-of-service scheduling technique. In at least one embodiment of the time-frame-based quality-of-service scheduling technique, memory controllers (e.g., memory controller 206 and memory controller 208) schedule memory requests according to a least-attained service rule. Central manager 220 collects information (e.g., $U_{K,1}$ and $U_{K,2}$ for first and second memory controllers, memory controllers 206 and 208, respectively, where K is the number of concurrently executing threads) from memory controllers 206 and 208 that includes for each individual thread in a memory request queue memory bandwidth usage information for that thread at the particular memory controller. In at least one embodiment of the time-frame-based quality-of-service scheduling technique, central manager 220 collects memory bandwidth usage information from memory controllers 206 and 208 every memory cycle. However, collection of the memory bandwidth usage information every memory cycle introduces high network traffic between memory controllers 206 and 208 and central manager 220. Referring to FIG. 12, in at least one embodiment of the distributed quality-of-service scheduling technique, central manager 220 receives memory bandwidth usage information from memory controllers 206 and 208 periodically, i.e., at the end of each mini-timeframe of a timeframe.

Referring back to FIG. 9, in at least one embodiment of the time-frame-based quality-of-service scheduling technique, an individual memory controller determines a memory bandwidth usage of each thread independently (602). The number of threads executing concurrently in a system (i.e., K) equals the number of processors times the number of hardware thread contexts supported per processor. In at least one embodiment of a processing system, at least one processor supports simultaneous multithreading and the number of hardware contexts is greater than one. Accordingly, in at least one embodiment of the time-frame-based quality-of-service scheduling technique, at a particular memory cycle, the local memory bandwidth usage of thread k for a memory controller m ($U_{k,m}$) is incremented (i.e., $U_{k,m} = U_{k,m}+1$) if the memory controller issues a memory command (e.g., activate, read, write, and precharge) for a memory request from a thread k. At a particular memory cycle, the local memory bandwidth usage of thread k from a memory controller m ($U_{k,m}$) is increased by 1/N (i.e., $U_{k,m}=U_{k,m}+1/N$) if a memory command (e.g., activate, read, write, or precharge) is not issued at the particular memory cycle, but there is an outstanding memory request for thread k in the memory request queue, where N is the number of total outstanding memory requests in the memory request queue at the particular memory cycle. This latter rule effectively allocates shares of the memory cycle to all threads with outstanding memory requests in the memory request queue of the memory controller.

In at least one embodiment of the time-frame-based quality-of-service scheduling technique, to reduce computation complexity, memory controllers 206 and 208 increment $U_{k,m}$ by an integer constant C (i.e., $U_{k,m}=U_{k,m}+C$, e.g., C=10) for the former rule and increase $U_{k,m}$ by C/N (i.e., $U_{k,m}=U_{k,m}+C/N$) for the latter rule. Referring to FIG. 12, during a mini-timeframe, each memory controller determines a memory bandwidth usage of each thread independently. At the end of each mini-timeframe, each memory controller sends its local memory bandwidth usage information to central manager 220. Referring back to FIG. 8, central manager 220 collects the local memory bandwidth usages $U_{k,m}$ sent from the memory controllers (604) and determines the system-wide memory bandwidth usage of thread k (i.e., $U_k$) in a mini-timeframe t, $U_{k,t}$, (606) as $$U_{k,t} = \sum_{m=1}^{M} U_{k,m,t}.$$

Using the measured system-wide memory bandwidth usage of each thread in each mini-timeframe, $U_{k,t}$, central manager 220 controls a quality-of-service priority, $P_k$, of thread k, for quality-of-service. In at least one embodiment, central manager 220 groups multiple mini-timeframes into a timeframe. At the beginning of a timeframe, the quality-of-service priorities of all threads are set to a predetermined value (e.g., $P_k=1$ for all k) and $U_k$ (i.e., the accumulated usage of thread k in a current timeframe) is reset to zero. At the end of each mini-timeframe, central manager 220 accumulates the $U_{k,t}$ from the memory controllers to calculate an accumulated system-wide memory bandwidth usage for thread k at the end of mini-timeframe $\tau$ ($AU_k^\tau$):

$$AU_k^\tau = \sum_{t=1}^{\tau} U_{k,t}.$$

Similarly, the system-wide memory bandwidth usage of thread k in the timeframe, $U_k$ (i.e., the accumulated system-wide memory bandwidth usage of thread k at the end of a current timeframe) is:

$$U_k = \sum_{t=1}^{T} U_{k,t},$$

where T is the number of mini-timeframes in the current timeframe. Note that $U_k=AU_k^\tau$ at the end of a timeframe, i.e., when $\tau=T$. At the end of mini-timeframe $\tau$, central manager 220 compares the accumulated system-wide memory bandwidth usage of thread k, (i.e., $AU_k^\tau$), to a predetermined quality-of-service (i.e., $\Phi_k$) for thread k over a timeframe, which in at least one embodiment of the scheduling technique is dynamically determined by an operating system or virtual machine monitor. A value of $AU_k^\tau$ that is greater than $\Phi_k$, implies that thread k has overutilized memory bandwidth for the timeframe. Thus, in at least one embodiment, central manager 220 computes thread priorities by lowering the quality-of-service priority of thread k from a prior value (e.g., from $P_k=1$ to $P_k=0$) if thread k has a value of $AU_k$ greater than or equal to a value of $\Phi_k$ (608). Then, central manager 220 communicates the priority (i.e., rank) information (e.g., $P_k$ for each thread) to each of the memory controllers (610). In at least one embodiment, central manager 220 sends a bit vector to each memory controller indicating which threads have used their share of system memory bandwidth.

In at least one embodiment of the time-frame-based quality-of-service scheduling technique, each of memory controllers 206 and 208 receives the thread priority information from central manager 220. Then, schedulers in memory controllers 206 and 208 (i.e., schedulers 212 and 214) locally schedule memory requests for the threads according to the priority information without further communication with central manager 220. Memory requests for a higher ranking thread are scheduled before memory requests for a lower ranking thread.

Figure 13:
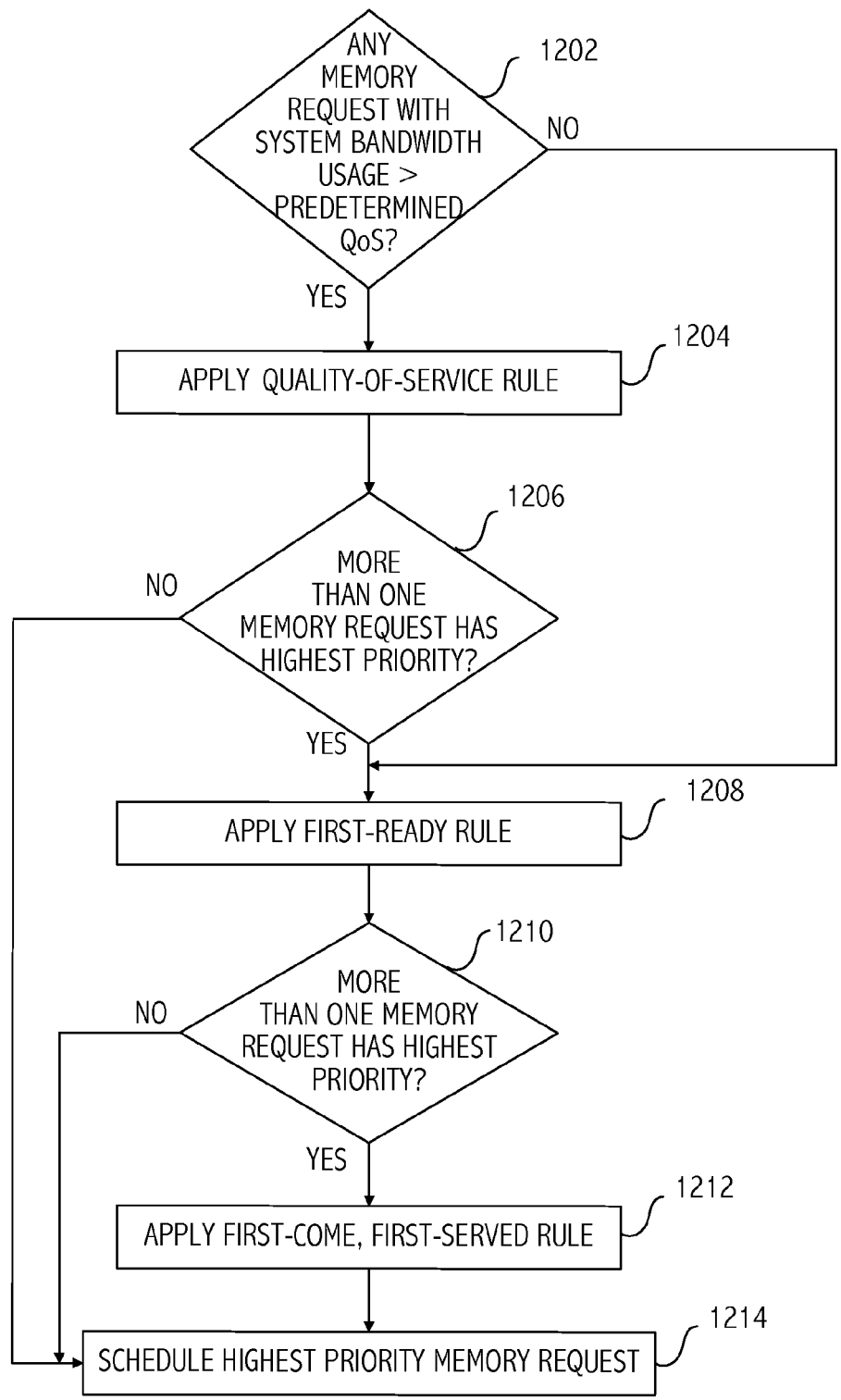
FIG. 13 illustrates information and control flows for a time-frame-based quality-of-service scheduling technique consistent with at least one embodiment of the invention.

Referring to FIG. 13, in at least one embodiment of the time-frame-based quality-of-service scheduling technique, a memory controller schedules a memory request from the memory request queue by determining whether to apply a quality-of-service rule (1202). For example, if no memory requests in the memory request queue have a quality-of-service priority equal to zero (e.g., $P_k=0$), which indicates that the associated thread has a system bandwidth usage that exceeds a predetermined quality-of-service allocated to that thread, then the memory controller does not apply the quality-of-service rule. If no threads exceed their predetermined quality-of-service, then the threads do not demand more bandwidth than allocated, and the system quality-of-service targets are satisfied.

However, if at least one memory request in the memory request queue has a quality-of-service equal to zero (i.e., $P_k=0$), then, the system quality-of-service target is not satisfied and the memory controller applies a quality-of-service rule (1204). Memory requests having a higher quality-of-service priority are scheduled first. That is, those memory requests associated with threads that are not overutilizing system memory bandwidth are scheduled before memory requests associated with threads that overutilize system memory bandwidth. If more than one memory request in the memory request queue of a memory controller has the highest quality-of-service priority (1206), then the memory controller applies a first-ready rule (1208), e.g., the memory controller assigns a higher priority to those memory requests that hit a row buffer over those memory requests that miss a row buffer. If more than one memory request in the memory request queue of a memory controller has the highest priority after application of the quality-of-service rule and the first-ready rule (1210), then the memory controller applies a first-come, first-served rule to the memory requests of highest priority (1212). That is, a memory request that arrives in the memory request queue earlier is assigned a higher priority than a memory request that arrives in the memory request queue later. Then the memory controller schedules the highest priority request (1214).

If the quality-of-service rule is bypassed because no memory requests in the memory request queue are associated with a thread that overutilizes the system memory bandwidth (1202), then the memory controller applies the first-ready rule to the memory requests in the memory request queue (1208). If more than one memory request in the memory request queue has a highest priority after application of the first-ready rule (1210), then the memory controller applies a first-come, first-served rule to those memory requests (1212) and schedules the highest priority memory request (1214).

In at least one embodiment of the time-frame-based quality-of-service scheduling technique, the quality-of-service rule is not applied because no threads use up their predetermined share of the system memory bandwidth (1202). Thus, the time-frame-based quality-of-service scheduling technique meets the quality-of-service target because threads demand less memory bandwidth than they are allocated. If some threads have used up their predetermined shares of the system memory bandwidth and some have not, the higher priority of underutilizing threads (i.e., $U_k<\Phi_k$) forces the scheduler to process the memory requests of the underutilizing threads first, which results in providing more system memory bandwidth to those threads. If all threads have used up their predetermined shares of the system memory bandwidth, then the quality-of-service rule does not influence memory request scheduling for the remainder of the timeframe. Note that the types and sequence of scheduling rules applied after the quality-of-service scheduling rule are exemplary only and other embodiments of a time-frame-based quality-of-service scheduling technique apply other types of scheduling rules in other orders after the application of the quality-of-service scheduling rule.

In at least one embodiment of the time-frame-based quality-of-service scheduling technique, the length of the timeframe is selected according to thread quality-of-service requirements. For example, the timeframe is selected to be shorter for multimedia applications, as compared to other applications, to enforce quality-of-service with finer granularity. In the case of general server applications, the timeframe is longer than for, e.g., multimedia applications, since the response time for server applications is also influenced by network delay, which typically has a higher variation. In at least one embodiment of the time-frame-based quality-of-service scheduling technique, the timeframe is one million memory cycles and includes 100 mini-timeframes, resulting in a mini-timeframe of 10,000 memory cycles and negligible network traffic for collecting $U_{k,m,t}$. The timeframe including 100 mini-timeframes is sufficient to calculate $U_k$ frequently and change $P_k$ accordingly in the timeframe.

Structures described herein may be implemented using software executing on a processor (which includes firmware) or by a combination of software and hardware. Software, as described herein, may be encoded in at least one tangible computer readable medium. As referred to herein, a tangible computer-readable medium includes at least a disk, tape, or other magnetic, optical, or electronic storage medium.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., HDL, Verilog, GDSII data) of such circuits, systems, and methods, all as described herein, and as defined in the appended claims.

The description of the invention set forth herein is illustrative, and is not intended to limit the scope of the invention as set forth in the following claims. For example, note that a memory-controller-parallelism-aware scheduling technique consistent with teachings described herein may use scheduling rules other than, and in other sequences than, those described herein. In addition, although the invention has been described in embodiments that include multiple processors, one of skill in the art will appreciate that the teachings herein can be utilized with other configurations of processors, e.g., one multi-threaded processor. Variations and modifications of the embodiments disclosed herein may be made based on the description set forth herein, without departing from the scope and spirit of the invention as set forth in the following claims.

What is claimed is:

1. A method comprising:
   determining system-wide memory bandwidth usage for a thread of a plurality of threads executing on at least one processor based on local memory bandwidth usage information associated with the thread periodically collected from a plurality of memory controllers during a timeframe;
   determining a quality-of-service priority of the thread based on the system-wide memory bandwidth usage for the thread and a predetermined quality-of-service for the thread;
   communicating the quality-of-service priority of the thread to each memory controller of the plurality of memory controllers; and
   locally scheduling a memory request requested by the thread according to the quality-of-service priority of the thread.

2. The method, as recited in claim 1, further comprising:
   periodically collecting the local memory bandwidth usage information associated with the thread,
   wherein determining the system-wide memory bandwidth usage includes accumulating over the timeframe the periodically collected local memory bandwidth usage information for the thread.

3. The method, as recited in claim 1, wherein the quality-of-service priority of the thread is greater than the quality-of-service priority of a second thread of the plurality of threads if the thread has a system-wide memory bandwidth usage less than the quality-of-service of the thread and the second thread has a system-wide memory bandwidth usage greater than a quality-of-service of the second thread.

4. The method, as recited in claim 1, wherein a memory controller of the plurality of memory controllers locally schedules the memory request and a central manager collects the local memory bandwidth usage information from the plurality of memory controllers.

5. The method, as recited in claim 1, further comprising:
   for a memory cycle, incrementing by C local memory bandwidth usage associated with the thread of the plurality of threads if a memory command issues for a memory request from the thread during the memory cycle, where C is a positive integer; and
   for the memory cycle, increasing by C/N the local memory bandwidth usage associated with the thread if no memory command issues during the memory cycle and an outstanding memory command is being executed for the thread, where N is the number of total outstanding memory commands for the memory cycle and C is a positive integer.

6. The method, as recited in claim 1, further comprising:
selecting a period for periodically collecting the local memory bandwidth usage information according to a target quality-of-service.

7. The method, as recited in claim 1, wherein the thread has a highest quality-of-service priority of threads with outstanding memory requests at a memory controller of the plurality of memory controllers and the memory request is scheduled before another memory request at the memory controller requested by a thread having a lower quality-of-service priority.

8. The method, as recited in claim 1, wherein the memory request has a highest quality-of-service priority of outstanding memory requests at a memory controller and at least a second memory request at the memory controller has the highest quality-of-service priority, and the scheduling is further based on sequential application of a first-ready rule and a first-come, first-served rule to the memory request and the at least a second memory request.

9. The method, as recited in claim 1, further comprising:
resetting the quality-of-service priority of the thread to a predetermined value at the beginning of each timeframe;
resetting the system-wide memory bandwidth usage information for the thread to zero at the beginning of each timeframe;
accumulating at each mini-timeframe of the timeframe the system-wide memory bandwidth usage information associated with the thread; and
updating at each mini-timeframe of the timeframe the quality-of-service priority based on the accumulated system-wide memory bandwidth usage information for the thread.

10. The method, as recited in claim 1, further comprising:
at the beginning of a timeframe, resetting an accumulated system-wide memory bandwidth for each thread of a plurality of threads and setting a quality-of-service priority of each thread to a predetermined value; and
at the end of a mini-timeframe within the timeframe:
determining a thread priority for each thread of the plurality of threads based on the predetermined quality-of-service for the thread and an accumulated system-wide memory bandwidth usage;
determining for each thread the accumulated system-wide memory bandwidth usage based on system-wide memory bandwidth usage for the thread in each mini-timeframe, the system-wide memory bandwidth usage for the thread in each mini-timeframe being based on a sum of the local memory bandwidth usages for the thread collected from a plurality of memory controllers, and
decreasing a quality-of-service priority of each thread from a corresponding prior value if the accumulated system-wide memory bandwidth usage of the thread is greater than or equal to the predetermined quality-of-service of the thread.

11. An apparatus comprising:
a central manager operative to generate quality-of-service priority information associated with a plurality of threads executing on at least one processor based on a predetermined quality-of-service for each thread and a system-wide memory bandwidth usage for each thread of the plurality of threads generated by the central manager based on corresponding local memory bandwidth usage information for each thread accumulated over a timeframe; and
a plurality of memory controllers operative to schedule memory requests associated with the plurality of threads based on the quality-of-service priority information associated with the plurality of threads.

12. The apparatus, as recited in claim 11,
wherein the central manager is operative to periodically collect the corresponding local memory bandwidth usage information for each thread from the plurality of memory controllers during a timeframe, and
wherein the central manager is operative to accumulate for each thread over the timeframe the periodically collected corresponding local memory bandwidth usage information for each thread and determine the system-wide memory bandwidth usage for each thread based thereon.

13. The apparatus, as recited in claim 11, wherein each of the plurality of memory controllers is operative to determine the corresponding local memory bandwidth usage for each of the plurality of threads.

14. The apparatus, as recited in claim 11,
wherein the central manager is operative to reset to a predetermined value a quality-of-service priority of each thread at the beginning of each timeframe,
wherein the central manager is operative to reset to zero the system-wide memory bandwidth usage for each thread at the beginning of each timeframe,
wherein the central manager is operative each mini-timeframe of the timeframe to accumulate for each thread the system-wide memory bandwidth usage for the thread, and
wherein the central manager is operative each mini-timeframe of the timeframe to update the quality-of-service priority of each thread based on the corresponding accumulated system-wide memory bandwidth usage.

15. The apparatus, as recited in claim 11, wherein the central manager is distributed across the plurality of memory controllers.

16. The apparatus, as recited in claim 11,
wherein a memory controller of the plurality of memory controllers is configured to increment by C a local memory bandwidth usage associated with a thread of the plurality of threads if a memory command issues for a memory request from the thread during the memory cycle, where C is a positive integer; and
wherein a memory controller of the plurality of memory controllers is configured to increase by C/N the local memory bandwidth usage associated with the thread if no memory command issues during the memory cycle and an outstanding memory command is being executed for the thread, where N is the number of total outstanding memory commands for the memory cycle and C is a positive integer.

17. The apparatus, as recited in claim 11, wherein a memory request for a thread of the plurality of threads has a highest quality-of-service priority of memory requests at a memory controller of the plurality of memory controllers and the memory request is scheduled before another memory request at the memory controller having a lower quality-of-service priority.

18. The apparatus, as recited in claim 11, wherein a memory request associated with a thread of the plurality of threads having a highest quality-of-service priority of outstanding memory requests at a memory controller of the plurality of memory controllers and at least a second memory request at the memory controller associated with a second thread of the plurality of threads having the highest quality-of-service priority are scheduled further based on sequential application of a first-ready rule and a first-come, first-served rule to the memory request and the at least a second memory request.

19. A method of operating a multi-core system comprising:
locally scheduling, by a memory controller of a plurality of memory controllers, a memory request associated with a first thread of a plurality of threads executing on at least one processor using a first system memory bandwidth less than a predetermined quality-of-service for the first thread in response to a second thread of the plurality of threads using a second system memory bandwidth that exceeds a predetermined quality-of-service for the second thread, the first and second system memory bandwidths being based on corresponding first and second local memory bandwidth usage information associated with first and second threads, respectively, accumulated over a timeframe; and
scheduling, by the memory controller, the memory request using another scheduling rule, otherwise.

20. The method, as recited in claim 19, further comprising:
determining the system-wide memory bandwidth usage of the first thread based on local memory bandwidth usage information generated at each of a plurality of memory controllers.

* * * * *